United States Patent [19]

Forney

[11] 4,276,464

[45] Jun. 30, 1981

[54] FUME EXTRACTING DEVICE FOR A WELDING APPARATUS

[75] Inventor: Melvin L. Forney, Metamora, Ill.

[73] Assignee: Caterpillar Tractor Co., Peoria, Ill.

[21] Appl. No.: 958,574

[22] Filed: Oct. 23, 1978

[51] Int. Cl.[3] .................................................. B23K 9/16

[52] U.S. Cl. ......................................... 219/136; 219/74; 219/137.41

[58] Field of Search ...................... 219/137.41, 74, 75, 219/136, 70, 72, 221; 98/115 R, 115 A, 115 VM; 15/300 R, 300 A; 228/220

[56] References Cited

U.S. PATENT DOCUMENTS

| | | | |
|---|---|---|---|
| 2,101,912 | 12/1937 | Meyer | 219/221 |
| 2,862,294 | 12/1958 | Philip | 219/137 R X |
| 2,887,562 | 5/1959 | Mencotti | 219/75 |
| 3,775,587 | 11/1973 | Lindkwist | 219/137.41 X |
| 3,826,888 | 7/1974 | Garfield | 219/74 |
| 3,875,364 | 4/1975 | Boyett | 219/74 |

FOREIGN PATENT DOCUMENTS

| | | | |
|---|---|---|---|
| 2401425 | 3/1975 | Fed. Rep. of Germany | 219/137.41 |
| 1526305 | 5/1964 | France | 219/137.41 |

*Primary Examiner*—E. A. Goldberg

*Attorney, Agent, or Firm*—Charles E. Lanchantin, Jr.

[57] ABSTRACT

A fume extracting device (10) for an arc welding apparatus (12) effectively removes fumes from the leading and trailing portions of the arc welding zone (82) while maintaining transverse compactness. The fume extracting device (10) includes first and second body portions (30) individually having an internal fume collecting chamber (50), a plurality of fume inlet passages (54), and a fume exhaust passage (48) and is so constructed that the body portions (30) are maintained in a preselected spaced apart relationship to each other and to the central axis (14) of the welding apparatus (12). Advantageously, first and second gas shielding devices (64) can be individually connected to the one of the body portions (30).

5 Claims, 3 Drawing Figures

FUME EXTRACTING DEVICE FOR A WELDING APPARATUS

DESCRIPTION

1. Technical Field

This invention relates to a fume extracting device for an arc welding apparatus, and particularly to a fume extracting device for effectively removing fumes from the leading and trailing portions of the arc welding zone.

2. Background Art

A number of fume extraction devices are known for removing noxious gases from the general vicinity of the distal end of a welding gun. Typically, such fume extracting devices comprise a conduit associated with the welding gun through which undesirable fumes are extracted by means of a vacuum applied to the conduit. Exemplary of such devices are those disclosed in U.S. Pat. No. 3,798,409 issued Mar. 19, 1974 to W. E. Troyer et al and U.S. Pat. No. 3,909,586 issued Sept. 30, 1975 to G. G. Landis et al.

Unfortunately, such prior art fume extracting devices are typically an integral part of the welding gun so that it is not possible to quickly convert the welding gun from an operation wherein the fume extracting device is not required, as is the case with certain types of weld wire, to an operation wherein fume extraction is essentially necessary for safety and visibility.

Another problem with the prior art fume extracting devices is that the walls of the fume extraction inlet opening have added extra width to the welding gun so that it cannot be effectively maneuvered into a narrow space. This problem is compounded when twin arc welding guns are contemplated for depositing increased amounts of weld material within a relatively short period of time. As far as is known there is no commercially available fume extracting device that is, for example, conveniently connectable to a twin arc unit of the type manufactured by The Lincoln Electric Company of Cleveland, Ohio. That referenced twin arc unit can be operated with a pair of flux cored welding wires of a first composition without the necessity of providing a separate gas shielding source, or alternately can be operated with another pair of flux cored welding wires of a second composition that requires gas shielding in order to improve the quality of the weld connecting the workpieces. In the latter instance, the volumetric capacity of the required fume extraction device is increased substantially, and yet the requirement still exists to retain a relatively narrow profile transverse the usual travel direction of the welding gun to enable weld to be deposited in a narrow corner.

The present invention is directed to overcoming one or more of the problems as set forth above.

DISCLOSURE OF INVENTION

In accordance with one aspect of the present invention, a fume extracting device for a welding apparatus includes first and second body portions individually having an internal fume collecting chamber, a plurality of fume inlet passages and a fume exhaust passage, and with the body portions being connected to the welding apparatus in a preselected spaced apart relationship with respect to each other and to the central axis of the welding apparatus.

Advantageously, the fume extracting device of the present invention is releasably secured to the welding apparatus in such a way that the first and second body portions can effectively remove fumes from the leading and trailing portions of the welding apparatus respectively, while maintaining a relatively narrow profile. Moreover, first and second gas shiedling devices can be connected to the respective body portions for directing a gas upon the weld arc zone to extend the versatility of the attachment.

BEST MODE FOR CARRYING OUT THE INVENTION

Figure 1:
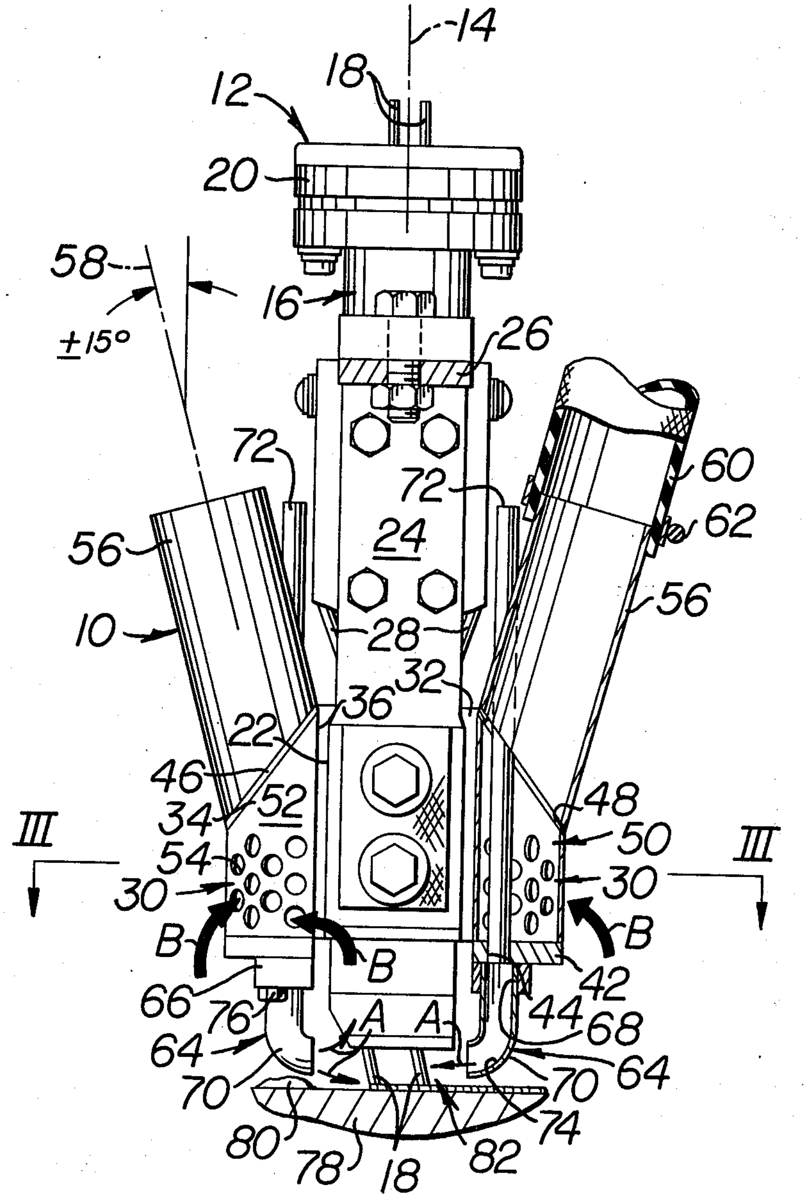
FIG. 1 is a diagrammatic side elevational view of one embodiment of the fume extracting device of the present invention as connected to a known welding apparatus and showing an associated workpiece.
Figure 2:
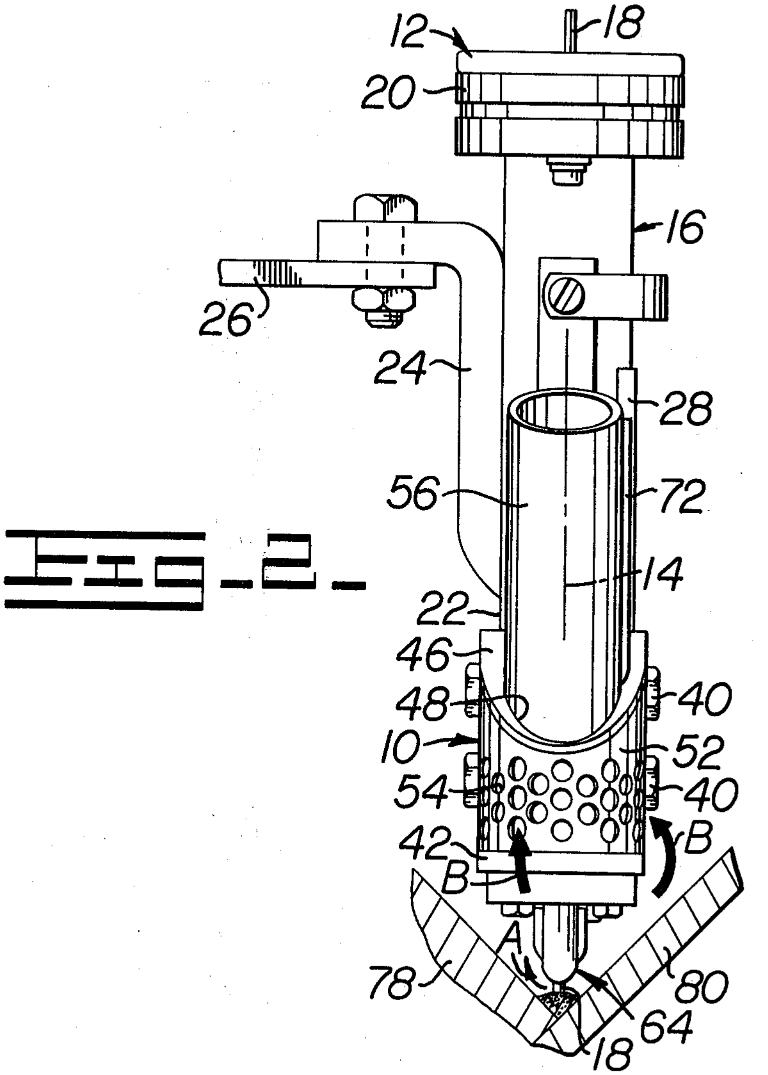
FIG. 2 is a diagrammatic end elevational view of the embodiment of FIG. 1.

Referring to FIGS. 1 and 2, a fume extracting device 10 constructed in accordance with the present invention is shown in connected relation to a conventional welding apparatus or welding gun 12. In the instant example, the welding apparatus 12 is a K-239 Innershield Twinarc Kit manufactured by The Lincoln Electric Company of Cleveland, Ohio. Such welding apparatus has an upright central axis 14, an elongate body 16 arranged along the axis, and a pair of consumable weld wires or electrodes 18 which slidably extend through the body. The body includes an upper portion 20 that can be releasably connected to an automatically movable welding frame, not shown, and a lower portion 22 of generally rectangular cross section having an upwardly extending current bar 24 connectable to a source of electricity 26. The lower portion of the welding apparatus is water cooled, and a pair of conduits 28 supply cool water to and deliver heated water away therefrom.

Figure 3:
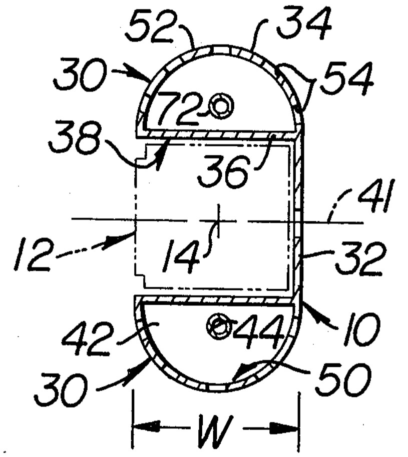
FIG. 3 is a diagrammatic cross sectional view of the fume extracting device of the present invention as taken along line III—III of FIG. 1.

The fume extracting device 10 has first and second elongate and upright body portions 30 of generally semicylindrical construction as is best shown in FIG. 3. Preferably, bridging means 32 is provided for connecting the first and second body portions and maintaining the body portions in a preselected spaced apart and substantially aligned relationship with respect to each other. Each of the body portions 30 includes a semicylindrical outer perforated wall 34 and an inner planar solid wall 36, so that the bridging means or mounting plate 32 defines with the solid walls an elongate rectangular cavity 38 for receiving the lower portion of the welding apparatus 12. A pair of fastening devices or bolts 40 extend through the mounting plate 32 and are screw threadably received in the welding apparatus to releasably secure the fume extracting device thereto in symmetrically overlapping and aligned relation to a transverse central plane 41 passing through the central axis 14.

Each of the body portions 30 of the fume extracting device 10 also includes a semicircular bottom plate or end member 42 having a relatively small passage 44 therethrough, and an inclined cover plate or upper end member 46 having a relatively large fume exhaust passage 48 therethrough. Thus, the outer wall 34, the inner wall 36, the bottom plate 42, and the cover plate 46 define an internal fume collecting chamber 50 therebetween and an exterior surface 52. A plurality of fume inlet passages 54 in the outer wall 34 connect the chamber to the exterior surface and, in the same manner, the fume exhaust passage 48 connects the chamber and the exterior surface.

An exhaust tube 56 is preferably so connected to each of the cover plates 46 in substantially aligned relation to each of the fume exhaust passages 48 that an axis 58 of the upstanding exhaust tube defines a preselected acute angle of about 15° with respect to the central axis 14 of the welding apparatus 12. As representatively illustrated, a flexible vacuum hose 60 is connected to the end of each of the exhaust tubes as by a conventional encircling adjustable retaining clamp 62.

In accordance with another aspect of the invention, first and second gas shielding devices 64 are preferably individually releasably connected to a respective one of the first and second body portions 30 of the fume extracting device 10 in facing relationship symmetrically on the opposite sides of the transverse central plane 41. In the instant example, each of the gas shielding devices 64 has a mounting plate 66 with an opening 68 therethrough, and a depending tube 70 of preselected arcuate construction secured to the mounting plate in the opening. A contoured gas entry tube 72 extends through the cover plate 46 and is received in the passage 44 in the bottom plates such that a shielding gas outlet passage 74 of the tube 70 is aligned therewith. Preferably, a plurality of fastening devices or bolts 76 extend through each of the mounting plates 66 and are screw threadably received in the bottom plates 42 of the body portions 30. In this way, the gas shielding devices 64 may be easily detached for replacement or servicing. Preferably the gas shielding devices are made of copper or the like to minimize adherence of weld spatter and to better conduct heat away from the vicinity of the welding arc. The body portions 30, on the other hand, are preferably made of mild steel since they will have a longer service life expectancy.

Industrial Applicability

In operation, the welding apparatus 12 is manipulated so that the welding wires 18 are disposed substantially adjacent two workpieces 78,80, while at the same time the usual electrical control circuitry therefor (not shown) is actuated to initiate arc welding at an arc welding zone 82. Simultaneously, the usual wire feed mechanism (not shown) is activated to continually urge the consumable weld wires toward the workpieces. Also, a shielding gas such as $CO_2$ is supplied to each of the tubes 72 and serially related tubes 70 so that a protecting and cooling gas envelope is provided in the region of the welding arcs as is indicated by the protecting gas flow indicating arrows A in FIG. 1. Note that the gas outlet passages 74 open outwardly adjacent the distal ends of the weld wires 18 and are aimed towards each other in the plane of longitudinal travel of the welding apparatus. Preferably the shielding gas is aimed at a preselected angle of declination with respect to the central axis 14 in order to rebound upwardly from the workpieces and better envelope the arc welding zone. In this way the shielding gas continues upward and outward flow as the welding apparatus moves to the left relative to the stationary workpieces when viewing FIG. 1 and deposits a band of weld material in the groove between the workpieces.

Concurrently, a suitable vacuum source is caused to operate to withdraw smoke and deleterious fumes generated at the welding arc zone 82 serially through each of the vacuum hoses 60, the exhaust tubes 56, and the body portions 30 of the fume extracting device 10. An advantageous flow of the fumes is inducted, as indicated by the fume exhaust flow indicating arrows B in both FIGS. 1 and 2, upwardly from the welding arcs and inwardly through the fume inlet passages 54 in a direction generally toward the central axis 14 into the fume collecting chambers 50. A substantial volume of ambient air is sucked into the opposite fume collecting chambers along with the hot gases emanating from the arcs so that the resultant temperature of the mixture of the gases is relatively cool. Heat is conducted upwardly from the copper gas shielding devices 64 and to the steel body portions 30 constantly being cooled by the gas mixture. Simultaneously water circulates through the lower portion 22 of the welding apparatus 12 via the conduits 28 to dissipate heat therefrom.

Thus it is apparent that the fume extracting device 10 can be easily attached to a welding apparatus for sucking off smoke from the leading and trailing portins of the arc welding zone. Moreover, this is achieved without adding significantly to the transverse width of the welding apparatus. Note, for example, in FIGS. 2 and 3 that the transverse width W is maintained at a relatively narrow value so that the welding apparatus and fume extracting device can be positioned deeply into a slot. This also permits the deposition of multiple bands of weld during successive passes in precisely overlapped relation by changing the angular position of the central axis 14 relative to the workpieces. A still further advantage is the preferred addition of the gas shielding devices 64. Such shielding devices can be quickly removed if not needed or if they interfere with the workpieces and extra room is required for positioning of the welding arcs. Lastly, all of these advantages are possible without any significant modification of a commercially available and proven twin arc welding apparatus.

Other aspects, objects, and advantages of this invention can be obtained from a study of the drawings, the disclosure, and the appended claims.

I claim:

1. A welding device (10, 12, 64) comprising in combination:

a welding gun (12) having a central plane (41) transverse to a normal direction of longitudinal movement of the gun (12); and a fume extracting and gas shielding device (10,64) including first and second body portions (30) individually having an exterior surface (52), an internal fume collecting chamber (50) and a plurality of fume inlet passages (54) connecting said chamber (50) and said exterior surface (52); bridging means (32) for maintaining said first and second body portions (30) in a preselected aligned relationship to each other substantially symmetrically on the opposite sides of said central plane (41) and said welding gun (12), said bridging means (32) and said first and second body portions (30) defining elongate cavity (38) of a construction sufficient for receiving a portion of said welding gun (12), and said bridging means (32) being of a construction sufficient for being releasably connected to said welding gun (12); and first and second gas shielding devices (64), said first shielding device (64) being connected to said first body portion (30) and said second shielding device (64) being connected to said second body portion (30).

2. The welding device (10, 12, 64) of claim 1 wherein said first and second body portions (30) are of generally semicylindrical tubular construction.

3. The welding device (10, 12, 64) of claim 1 wherein each of said body portions (30) includes a relatively flat wall (36) and a semicylindrical wall (34), each of said relatively flat walls being substantially parallel to and facing said central plane (41), and each of said semicylindrical walls (34) facing away from said central plane (41).

4. The welding device (10, 12, 64) of claim 3 wherein said fume inlet passages (54) are formed solely in said semicylindrical walls (34).

5. The welding device (10, 12, 64) of claim 1 wherein each of said first and second gas shielding devices (64) includes a shielding gas outlet passages (74) oriented generally toward said central plane (41).

* * * * *